(12) United States Patent
Cheong et al.

(10) Patent No.: US 6,898,696 B1
(45) Date of Patent: May 24, 2005

(54) METHOD AND SYSTEM FOR EFFICIENTLY RESTORING A PROCESSOR'S EXECUTION STATE FOLLOWING AN INTERRUPT CAUSED BY AN INTERRUPTIBLE INSTRUCTION

(75) Inventors: Hoichi Cheong, Austin, TX (US); Hung Qui Le, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 742 days.

(21) Appl. No.: 09/332,413

(22) Filed: Jun. 14, 1999

(51) Int. Cl.[7] .............................................. G06F 15/00
(52) U.S. Cl. ...................... 712/228; 712/239; 712/206
(58) Field of Search ...................... 712/228, 233–234, 712/239, 206

(56) References Cited

U.S. PATENT DOCUMENTS

| | | | | |
|---|---|---|---|---|
| 4,566,063 A | * | 1/1986 | Zolnowsky et al. | ........ 712/241 |
| 5,269,017 A | * | 12/1993 | Hayden et al. | ................ 714/15 |
| 5,381,533 A | * | 1/1995 | Peleg et al. | .................. 712/215 |
| 5,649,136 A | * | 7/1997 | Shen et al. | ................... 712/244 |
| 5,918,046 A | * | 6/1999 | Hoyt et al. | ................... 712/239 |
| 5,940,618 A | * | 8/1999 | Blandy et al. | ............... 395/704 |
| 6,088,525 A | * | 7/2000 | Peri | ............................ 395/704 |
| 6,131,157 A | * | 10/2000 | Wang et al. | ................. 712/218 |

* cited by examiner

Primary Examiner—Gautam R. Patel
(74) Attorney, Agent, or Firm—Anthony V.S. England; Casimer K. Salys; Dillon & Yudell LLP (57) ABSTRACT

A method and system for increasing the efficiency of execution in a processor. Instructions are dispatched in instruction groups, wherein if such an instruction group contains an interruptible instruction of a selected type, only one interruptible instruction of the selected type is included in the instruction group. A state of the processor is recorded, associated respectively with each of said dispatched instruction groups. The processor is restored to the recorded state associated with the instruction group containing the interruptible instruction of the selected type causing an interrupt, in response to the interrupt from one of the interruptible instructions of the selected type.

13 Claims, 7 Drawing Sheets

METHOD AND SYSTEM FOR EFFICIENTLY RESTORING A PROCESSOR'S EXECUTION STATE FOLLOWING AN INTERRUPT CAUSED BY AN INTERRUPTIBLE INSTRUCTION

BACKGROUND OF THE INVENTION

1. Field of the Invention

The present invention relates in general to an improved data processing system and in particular to an improved system and method for increasing the efficiency of execution of a processor in restoring a state of the processor. Still more particularly, the present invention relates to an improved system and method for restoring a pipelined processor to the proper state after a branch which is mispredicted where the restoration does not degrade the performance of the processor and where instructions within the improved data processing system are tracked in groups.

2. Description of the Related Art

High performance processors currently utilized in data processing systems today may be capable of "superscalar" operation and may have "pipelined elements." A superscalar processor has multiple elements which operate in parallel to process multiple instructions in a single processing cycle. Pipelining involves processing instructions in stages, so that the pipelined stages may process a number of instructions concurrently. In these high performance microprocessors, it is also advantageous to support speculative execution of instructions using branch prediction mechanisms, out-of order execution, and multiple pipelines in order to increase the number of instructions being processed at one time.

While instructions may be originally prepared to be processed in some logical programmed sequence, it should be understood that the instructions may be processed, in some respects, in a different sequence through speculative execution. However, since instructions are not totally independent of one another, complications may arise. Furthermore, if one instruction is dependent on a first instruction and the instructions are to be processed concurrently or the dependent instruction is to be processed before the first instruction, an assumption must be made regarding the result produced by the first instruction.

If an assumption used for processing an instruction proves to be incorrect then the result produced by the processing of the instruction will almost certainly be incorrect. Therefore, the pipeline must be flushed of all instructions after the instruction for which the assumption is made and the processor state must recover to a state with known correct results up to the instruction for which the assumption is made. (Herein, an instruction for which an assumption has been made is referred to as an "interruptible instruction," and the determination that an assumption is incorrect, triggering the need for the processor state to recover to a prior state, is referred to as an "interruption" or an "interrupt point.") For example, when a branch instruction is speculatively executed, but is mispredicted, an interruption occurs and the processor needs to return to the state of the branch instruction and abandon any instructions or results executed thereafter. Moreover, in addition to the previous example, there are other events which may occur which require recovery of the processor state due to an interrupt.

A completion table or re-order buffer is known for saving a processor state before an interruptible instruction so that if an interrupt does occur, the completion table control logic may recover the processor state to the interrupt point. In a shallow-pipelined processor, saving the state of each interruptible instruction within the pipeline is relatively easy and many such methods have been developed. However, in a deep-pipelined processor, the number of available pipeline stages is increased, whereby the number of possible active instructions is increased. Saving the state of each interruptible instruction in the same manner as for shallow-pipelines would require a much larger set of state information with greater complexity for restoration. In addition, in microprocessors which allow multiple branch predictions at one time, the complexity of storing the state information needed to restore the processor state increases dramatically as the number of positions in a pipeline increases.

In keeping a record in the completion table for each instruction, a large number of records are created without ever being utilized and the space utilized to store the groups of records is inefficient. For example, in order to keep track of N active instructions with a maximum of M instructions dispatched per cycle, it would be necessary to create M records to be saved during the dispatch cycle. Furthermore, N state records must be kept so that the state of the processor can be restored when an interrupt occurs. When M and N grow in wide dispatch and deep-pipelined processors, the complexity to create, manage and retrieve records has a negative impact on the high frequency ability of the microprocessor.

There is a need for a method of bookkeeping for a deep-pipelined processor such that the number of records and complexity thereof is reduced. In addition, for such a method, it is desirable that a deep-pipeline processor may be utilized without the performance of the microprocessor being degraded due to branch and other interruptible instructions in speculative execution. Furthermore, for such a method, it is desirable that in particular, in the event of a branch misprediction or other such interruptible instructions for which a fast restoration time is desired, the pipeline is quickly flushed and the processor restored to the proper state before the branch misprediction occurred.

SUMMARY OF THE INVENTION

It is therefore one object of the present invention to provide an improved data processing system.

It is another object of the present invention to provide an improved method and system increasing the efficiency of a processor for restoring a state of the processor.

It is yet another object of the present invention to provide an improved system and method for restoring a pipelined processor to the proper state after a branch that is mispredicted where the restoration does not degrade the performance of a microprocessor and where instructions within the improved data processing system are tracked in groups.

The foregoing objects are achieved as is now described. A method and system for increasing the efficiency of execution in a processor are provided. Instructions are dispatched in instruction groups, wherein if such an instruction group contains an interruptible instruction of a selected type, only one interruptible instruction of the selected type is included in the instruction group. A state of the processor is recorded, associated respectively with each of said dispatched instruction groups. The processor is restored to the recorded state associated with the instruction group containing the interruptible instruction of the selected type causing an interrupt, in response to the interrupt from one of the interruptible instructions of the selected type.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
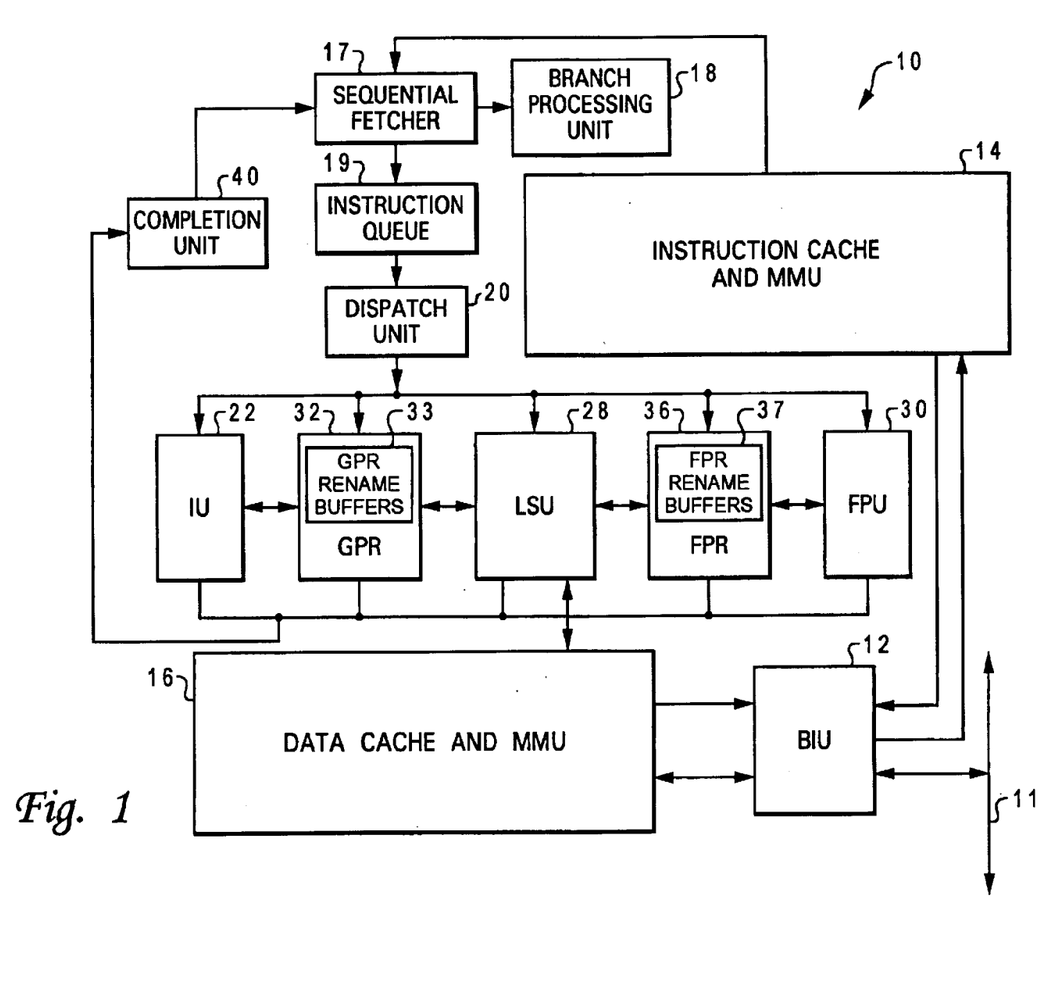
FIG. 1 illustrates a block diagram of a processor for processing data in accordance with the present invention.

With reference now to the figures and in particular with reference to FIG. 1, there is depicted a block diagram of a processor, indicated generally at 10, for processing data in accordance with the present invention. In the depicted illustrative embodiment, processor 10 comprises a single integrated circuit superscalar microprocessor capable of executing multiple instructions per processor cycle. For the present embodiment of the invention, the selected type of interruptible instructions illustrated which require fast restoration time are branch instructions. However, in other embodiments alternate types of interruptible instructions which require fast restoration time may be selected. Accordingly, as discussed further below, processor 10 includes various execution units, registers, buffers, memories, and other functional units, which are all formed by integrated circuitry. In a preferred embodiment of the present invention, processor 10 comprises one of the PowerPC™ line of microprocessors or other deep-pipelined processors. However, those skilled in the art will appreciate from the following description that the present invention can advantageously be implemented within other suitable processors, particularly those which provide a substantial amount of pipeline stages.

As illustrated in FIG. 1, processor 10 is coupled to bus 11 via a bus interface unit (BIU) 12 within processor 10. BIU 12 controls the transfer of information between processor 10 and other devices coupled to bus 11, such as a lower level cache or main memory (not illustrated), which together with processor 10 and bus 11 form a fully functional data processing system. BIU 12 is also connected to instruction cache 14 and data cache 16 within processor 10. High-speed caches, such as instruction cache 14 and data cache 16, enable processor 10 to achieve relatively fast access times to a subset of data or instructions previously transferred from lower level memory to caches 14 and 16, thus improving the overall performance of the data processing system. Instruction cache 14 is further connected to sequential fetcher 17, which fetches up to a cache line of instructions from instruction cache 14 during each cycle and transmits the fetched instructions to both branch processing unit (BPU) 18 and instruction queue 19. Branch instructions are retained by BPU 18 for execution and are cancelled from instruction queue 19; sequential instructions, on the other hand, are cancelled from BPU 18 and buffered within instruction queue 19 for subsequent execution by sequential instruction execution circuitry within processor 10.

In the depicted illustrative embodiment, in addition to BPU 18, the execution circuitry of processor 10 comprises multiple execution units for sequential instructions, including one or more integer units (IUs) 22, a load-store unit (LSU) 28, and a floating-point unit (FPU) 30. As is well-known to those skilled in the computer arts, each of execution units 22, 28, and 30 typically executes one or more instructions of a particular type of sequential instructions during each processor cycle. For example, IU(s) 22 perform integer mathematical and logical operations such as addition, subtraction, ANDing, ORing, and XORing, utilizing source operands received from specified general purpose registers (GPRs) 32 or GPR rename buffers 33. Following the execution of an integer instruction, IU 22 outputs the data results of the instruction to GPR rename buffers 33, which provide temporary storage for the result data until the result data is written from GPR rename buffers 33 to one or more of GPRs 32. FPU 30 typically performs single and double-precision floating-point arithmetic and logical operations, such as floating-point multiplication and division, on source operands received from floating-point registers (FPRs) 36 or FPR rename buffers 37. FPU 30 outputs data resulting from the execution of floating-point instructions to selected FPR rename buffers 37, which temporarily store the result data until the result data is written from FPR rename buffers 37 to selected FPRs 36. As its name implies, LSU 28 typically executes floating-point and fixed-point instructions which either load data from memory (i.e., either data cache 16 or main memory) into selected GPRs 32 or FPRs 36 or which store data from a selected one of GPRs 32, GPR rename buffers 33, FPRs 36, or FPR rename buffers 37 to memory.

Processor 10 employs both pipelining and out-of-order execution of instructions to further improve the performance of its superscalar architecture. Accordingly, instructions can be executed opportunistically by IUs 22, CCU 24, LSU 28, and FPU 30 in any order as long as data dependencies and antidependencies are observed. In addition, as is typical of many high-performance processors, each instruction is processed at a number of pipeline stages, including fetch, decode/dispatch, execute, finish, and completion/writeback.

During the fetch stage, sequential fetcher 17 retrieves up to a cache line of instructions from instruction cache 14. As noted above, sequential instructions fetched from instruction cache 14 are buffered within instruction queue 19, while branch instructions are removed (folded out) from the sequential instruction stream. Branch instructions are processed at each of the remaining pipeline stages by circuitry within BPU 18.

During the decode/dispatch stage, dispatch unit 20 decodes and dispatches one or more sequential instructions from instruction queue 19 to execution units 22, 24, 28, and 30. In particular, during the decode stage the instruction is decoded into different control bits, which in general designate: i) a type of functional unit for performing the operation specified by the instruction; ii) source operands for the instruction; iii) destinations for results of operations. During the decode/dispatch stage, dispatch unit 20 also allocates a rename buffer within GPR rename buffers 33 or FPR rename buffers 37 for each dispatched instruction's result data, if necessary. In the depicted illustrative embodiment, instructions dispatched by dispatch unit 20 are also passed to a completion buffer within completion unit 40. Processor 10 tracks the program order of the dispatched instructions during out-of-order execution utilizing unique instruction identifiers associated with the instructions in the completion buffer of completion unit 40. In addition, during the decode/dispatch stage, a processor state record may be made in the completion buffer of completion unit 40.

During the execute stage, execution units 22, 24, 28, and 30 execute sequential instructions received from dispatch unit 20 opportunistically as operands and execution resources for the indicated operations become available. Each of execution units 22, 24, 28, and 30 are preferably equipped with a reservation station that stores instructions dispatched to that execution unit until operands or execution resources become available. After execution of an instruction has terminated, execution units 22, 28, and 30 store data results of the instruction within either GPR rename buffers 33 or FPR rename buffers 37, depending upon the instruction type. CCU 24, on the other hand, stores the condition code bits it generates within the condition code field of one of CR rename buffers 46.

Next, execution units 22, 24, 28, and 30 notify completion unit 40 which instructions stored within the completion buffer of completion unit 40 have finished execution. Instructions are then completed by completion unit 40 in program order by marking the instructions as complete in the completion buffer. Thereafter, during the writeback stage, which is preferably merged with the completion stage, the results of the instructions are transferred from a CR rename buffer 46 to CR 44 and from GPR rename buffers 33 and FPR rename buffers 37 to GPRs 32 and FPRs 36, respectively.

Figure 2:
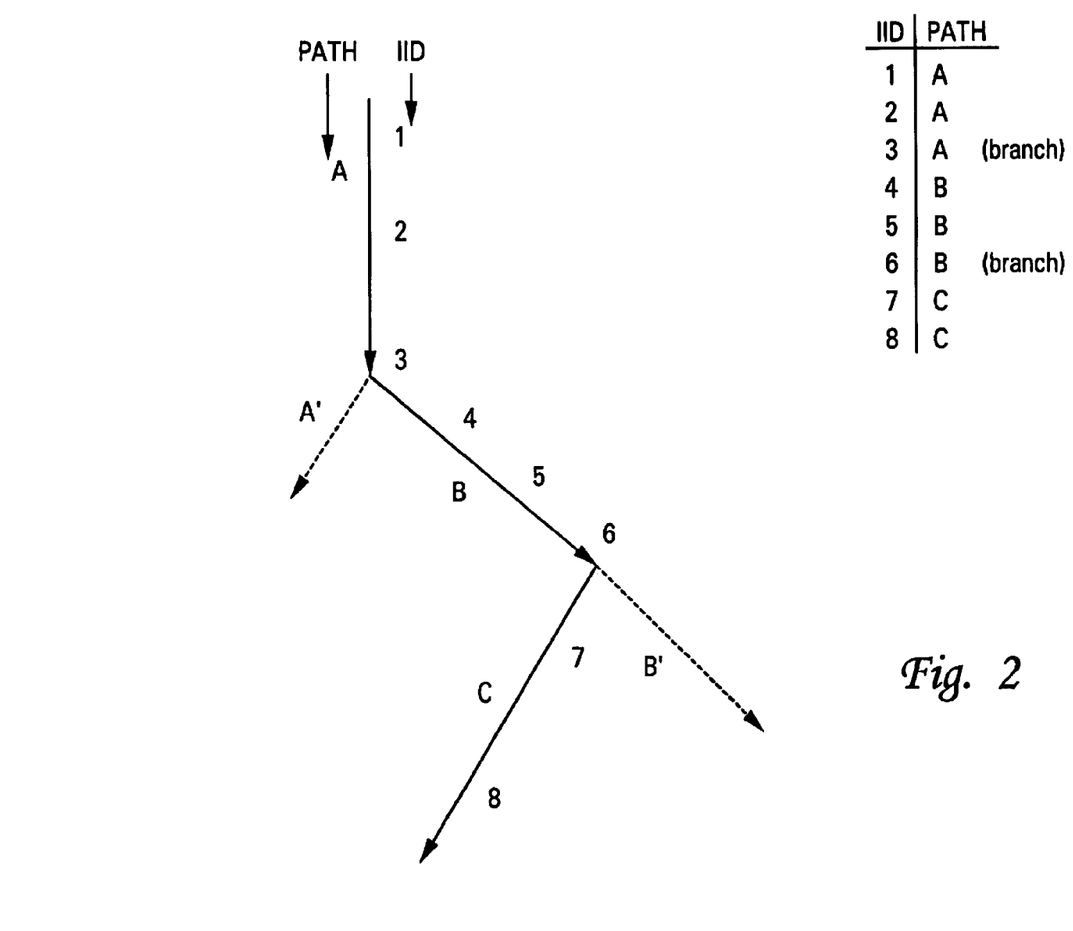
FIG. 2 depicts an example of a speculative instruction path for the microprocessor of the present invention.

Referring now to FIG. 2, there is depicted an example of a speculative instruction path for the microprocessor of the present invention. Upon dispatch from the dispatch unit, instructions are assigned an instruction identifier (IID) that is maintained in association with the issued instruction until the instruction is completed. As illustrated in FIG. 2, eight speculative instructions have been issued IIDs 1–8. Instruction 3 and instruction 6 are branch instructions that modify the link or count registers. Each instruction 1–8 belongs to a speculative instruction path in the instruction stream executed by the microprocessor. Instructions 1–3 lie within speculative instruction path A. Instruction 3 is a branch instruction which branches the instruction stream into speculative path B. If the branch had not been taken an interrupt would occur and the instruction sequence would continue along instruction path A to the subsequent instructions in leg A' of path A. Instructions 4–6 comprise speculative instruction path B. Instruction 6 is a branch instruction that branches the instruction sequence to speculative path C.

Speculative instruction path C includes instructions 7 and 8. If the branch at instruction 6 had not been taken, an interrupt would occur and the instruction sequence would continue along speculative instruction path B to execute subsequent instructions in leg B' of speculative path B. In addition, instructions 1, 2, 4, 5, 7 and 8 may be interruptible instructions other than branch instructions whereby an interrupt would disrupt the path sequence.

Figure 3:
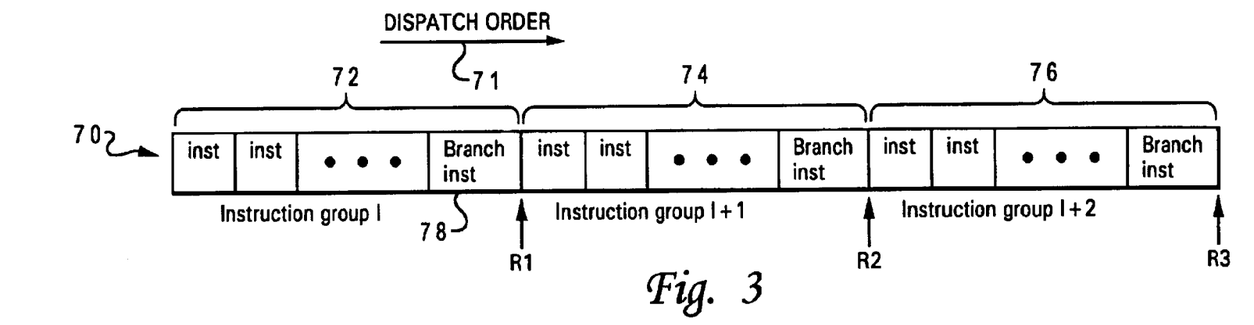
FIG. 3 illustrates a pictorial illustration of a pipeline containing multiple instructions in multiple states of execution.

With reference now to FIG. 3, there is illustrated a pictorial illustration of pipeline 70 containing multiple instructions in multiple states of execution. The instructions are dispatched in the order indicated by the arrow illustrated at reference numeral 71.

Multiple instructions are depicted in instruction groups where each instruction group contains a maximum of N instructions where N is the maximum number of instructions dispatched per cycle by dispatch unit 20. Each instruction group is represented by a single record of the state of the processor following the last instruction dispatched in the group. In the present example, pipeline 70 contains instruction group I as illustrated at reference numeral 72, instruction group I+1 as depicted at reference numeral 74 and instruction group I+2 as illustrated at reference numeral 76. The processor state record for instruction group I is recorded as R1. Next, the processor state for instruction group I+1 is recorded as R2. Finally, the processor state for instruction group I+2 is recorded as R3. For the present example, it is assumed that instruction group I+I is the guessed path from branch instruction 78 and that instruction group I+2 is the guessed path from the branch instruction of instruction group I+1.

Also in the example depicted, any branch instructions are ordered at the end of an instruction group, whereby the state of the processor after the branch instruction is recorded as the processor state record. For example, branch instruction 78 is the last instruction in instruction group I.

By the present invention, the processor state may be quickly restored when it is discovered that a branch instruction has been mispredicted, thus restoring the processor state to that of the mispredicted branch instruction, as will be further depicted.

The order of instructions dispatched per cycle in the instruction groups is determined in order to favor instructions that would most likely cause an interruption. In particular, a type of interruptible instruction to be favored is selected and ordered. From program running time statistics, branch instructions are most likely to cause an interruption due to branch misprediction. From the example illustrated in FIG. 2, it is evident that if a branch or multiple branches are speculatively executed and then found to be mispredicted, in order to take the proper path, the speculatively executed instructions must be abandoned and the processor state returned to the branch instruction in order to take the correct path.

In the present embodiment, since branch instructions are most likely to cause an interruption and the processor state can be easily recovered to the last instruction of an instruction group, one branch instruction may be dispatched at the end of each instruction group, wherein the selected type of instruction is a branch instruction. In alternate embodiments, other high frequency flush instructions, such as load and store instructions, may be determined as the selected type of interruptible instruction to be distributed to the end of each instruction group.

Figure 4:
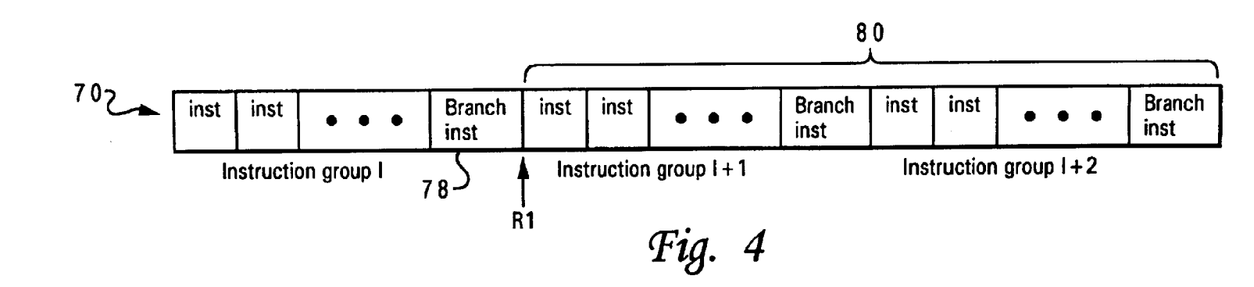
FIG. 4 depicts a pictorial illustration of a pipeline after a branch misprediction.

Referring now to FIG. 4, there is depicted a pictorial illustration of pipeline 70 after an interruption due to a branch misprediction of branch instruction 78. As illustrated at reference numeral 80, all instructions recorded after processor state R1 are flushed from the pipeline. In addition, the pipeline is returned to the processor state R1. Thereafter, new instruction groups are dispatched to pipeline 70 and the processor executes these instructions within pipeline 70 from the processor state following the branch instruction.

In addition, FIG. 4 depicts the importance of placement of the selected type of interruptible instruction, which is a branch instruction in the present example. If other instructions followed branch instruction 78 within instruction group I, upon a misprediction, the processor state would not return to the branch instruction. For example, consider instruction group I including the following instructions in order: "inst", "inst", "branch instruction 78, "inst", and "inst", where branch instruction 78 is the selected type of interruptible instruction and the processor state R1 for instruction group I is recorded after the last "inst". Instruction groups I+1 and I+2 are dispatched as the predicted path from the branch instruction. In this case, in the event of a misprediction from the branch instruction, the processor state would be returned to the last "inst" instruction in instruction group I. However, these "inst" instructions following the branch instruction should also be flushed to recover the processor state after the branch instruction.

Figure 5:
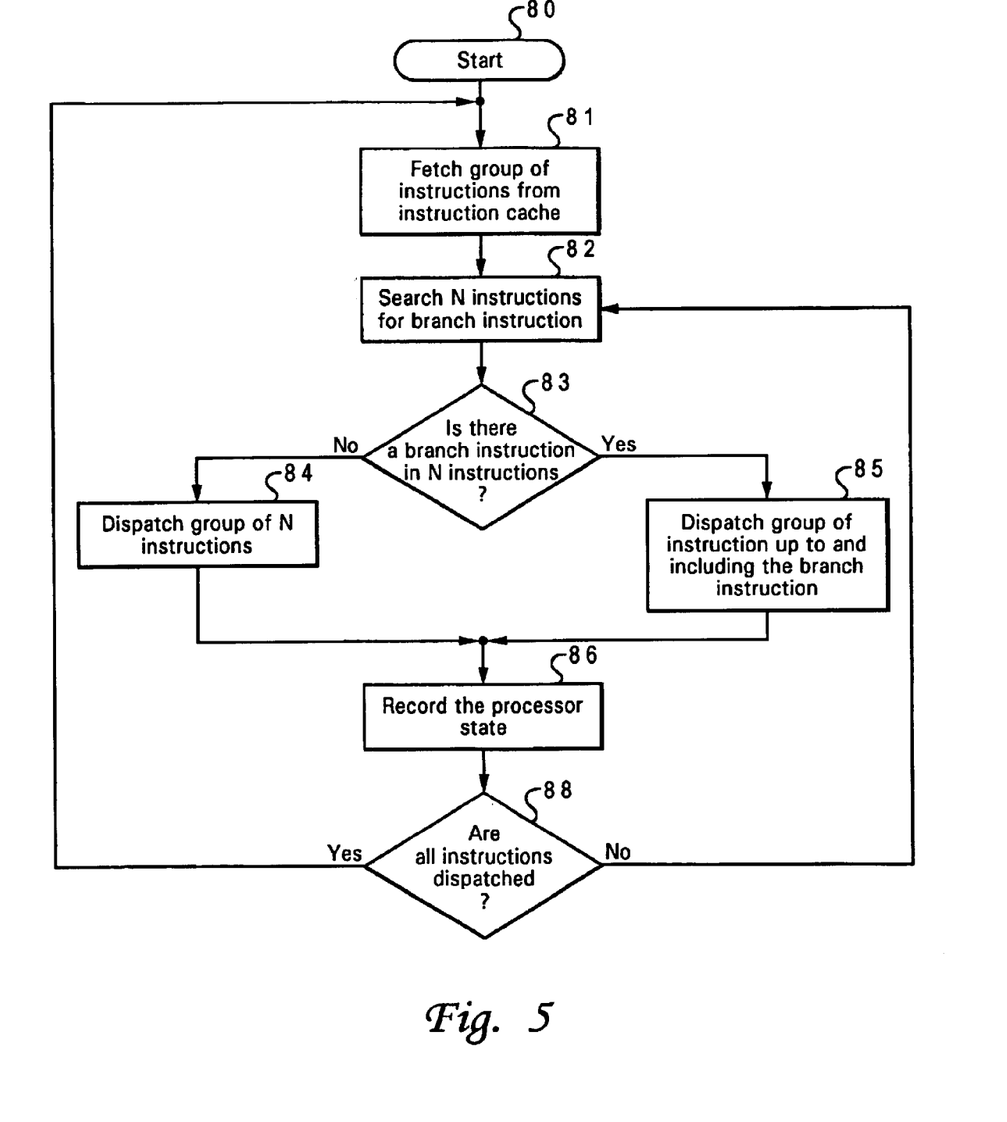
FIG. 5 is a high level logic flowchart illustrating the process of storing a processor state for each instruction group.

With reference now to FIG. 5, there is illustrated a high level logic flowchart illustrating the process of storing the processor state for each instruction group. As depicted, the process starts at block 80 and thereafter proceeds to block 81. Block 81 illustrates fetching a group of instructions from the instruction cache. Thereafter, block 82 depicts searching N instructions for the branch instruction. Preferably, the fetched instruction group contains a number of instructions greater than N where N is the maximum number of instructions which may be dispatched during a single cycle. Further, since the branch instruction is the selected type of interruptible instruction with a fast restoration time, the branch instruction is the instruction searched for in block 82.

Next, block 83 illustrates a determination of whether there is a branch instruction within the N instructions. If there is not a branch instruction, the process passes to block 84. Block 84 depicts dispatching the group of N instructions. By the process, it is not necessary to include an interruptible instruction of the selected type in an instruction group. If there is a branch instruction in the N instructions, the process passes to block 85. Block 85 illustrates dispatching a group of instructions up to and including the first branch instruction within the N instructions. Thereby, branch instructions are always the last instruction dispatched within a group if there is a branch instruction to be dispatched and only one branch instruction is included in a single instruction group. Furthermore, if an interruptible instruction other than a branch instruction is the selected type of interruptible instruction, that interruptible instruction would follow the same process above as depicted for the branch instruction.

From either block 84 or block 85, the process passes to block 86. Block 86 illustrates the recordation of the processor state. Next, block 88 depicts a determination of whether all the fetched instructions have been dispatched. If all the fetched instructions have been dispatched, the process passes to block 81. If all the fetched instructions have not been dispatched, the process passes to block 82.

Figure 6:
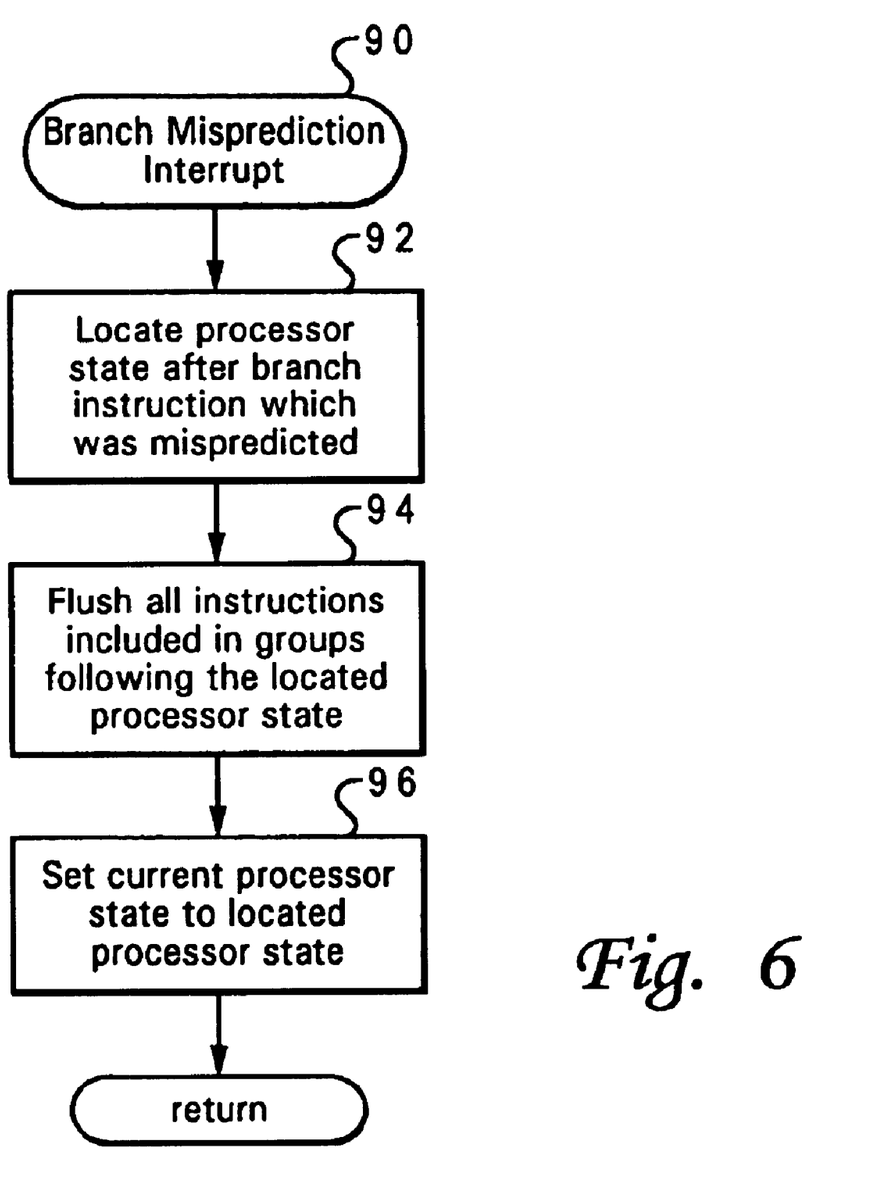
FIG. 6 is a high level logic flowchart depicting the process of flushing and restoring a pipeline when a branch misprediction occurs as depicted in FIG. 4.

Referring now to FIG. 6, there is depicted a high level logic flowchart illustrating flushing and restoring a pipeline when an interruption due to a branch misprediction occurs as depicted in FIG. 4. As illustrated, the process starts at block 90 as an interrupt when a branch misprediction occurs. Thereafter, block 92 depicts locating the state of the processor occurring just after the branch instruction was mispredicted. In particular, the state of the processor recorded for the instruction group causing the interruption, is located. Next, block 94 illustrates flushing of all instructions included in instruction groups following the located processor state. Thereafter, block 96 depicts setting the current processor state to the located processor state whereafter the process returns. In particular, in the example illustrated, since the recorded processor state is the state of the last instruction which is a branch instruction, the state of the branch instruction is always readily available for fast restoration when a branch misprediction occurs.

Figure 7:
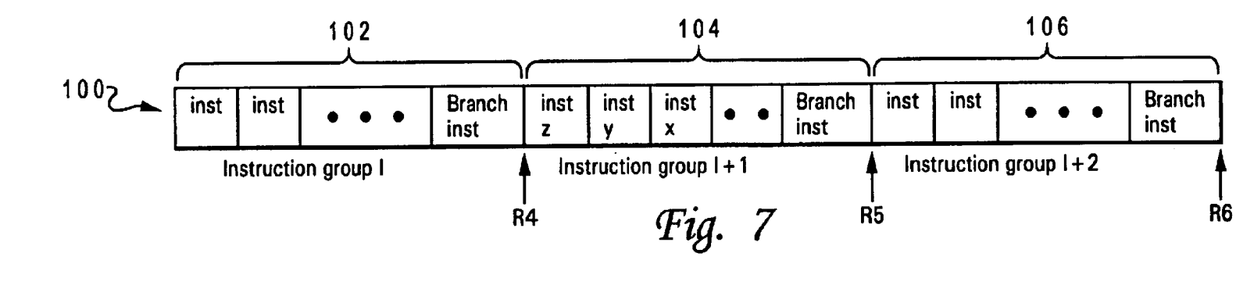
FIG. 7 illustrates a pictorial illustration of a pipeline containing multiple instructions in multiple states of execution.

Referring now to FIG. 7, there is depicted a pictorial illustration of a pipeline 100 containing multiple instructions in multiple states of execution. Instruction groups of instructions are illustrated at reference numerals 102, 104 and 106. The size of the instruction groups and recordation thereof is similar to the method described in FIG. 3. A state record R4 is recorded after dispatching instruction group I. Next, a state record R5 is recorded after dispatching instruction group I+1. Thereafter, a state record R6 is recorded after dispatching instruction group I+2. In the particular example, instruction X illustrated at reference numeral 108 is an interruptible instruction in which an interrupt is initiated during execution in order to re-execute instruction X. Furthermore, instruction X is not a branch instruction and is dispatched in the middle of the group, thus the processor state corresponding to instruction X is not available for fast restoration.

Figure 8:
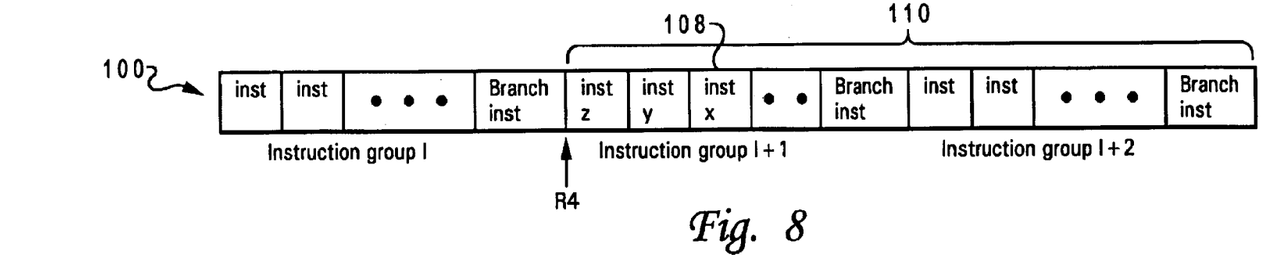
FIG. 8 depicts a pictorial illustration of the pipeline of FIG. 7 where instruction groups have been flushed by the pipeline due to the execution of instruction x.

With reference now to FIG. 8, there is illustrated a pictorial illustration of pipeline 100 where instruction groups I+1 and I+2 have been flushed by pipeline 100 due to the execution of instruction X. In addition, the processor state returns to R4 which is the processor state prior to the execution of instruction group I+1.

Figure 9:
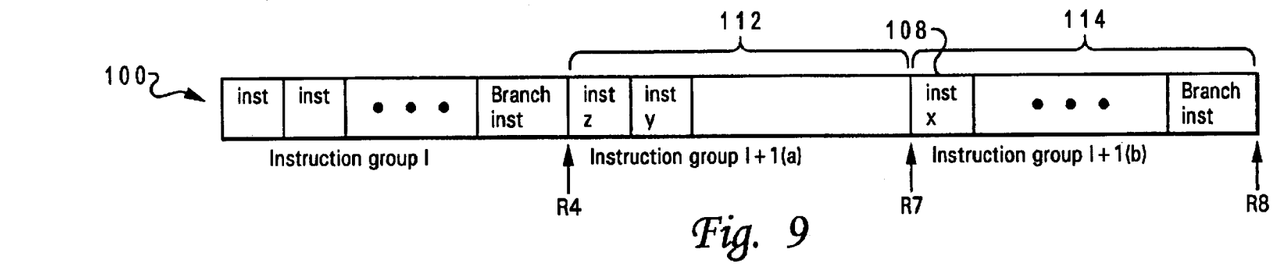
FIG. 9 illustrates a pictorial illustration of the pipeline of FIG. 7 where an instruction group is redispatched into two new record groups.

Referring now to FIG. 9, there is depicted a pictorial illustration of pipeline 100 where instruction group I+1 is redispatched into two new instruction groups. An instruction group I+1(a) is illustrated at reference numeral 112 containing instructions Z and Y which were executed prior to instruction X. After the dispatching of instruction group I+1(a) a processor state R7 is recorded. In addition, an instruction group I+1(b) is depicted at reference numeral 114 containing instruction X and all instructions following thereafter from the previous instruction group I+1. A processor state RB is recorded after instruction group I+1(b).

Figure 10:
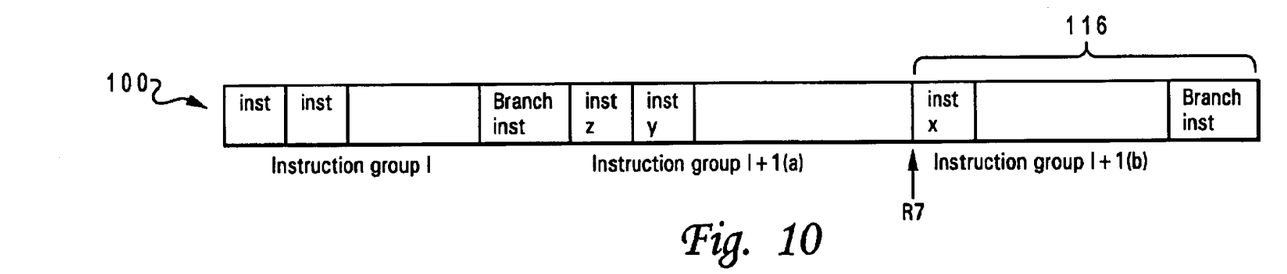
FIG. 10 depicts a pictorial illustration of the pipeline of FIG. 7 where an instruction group of the two new instruction groups of FIG. 9 has been flushed from the pipeline.

With reference now to FIG. 10, there is illustrated a pictorial illustration of pipeline 100 where instruction group I+1(b) has been flushed from pipeline 100. For instruction X, upon execution, instruction X is flushed. In addition, in the present example, the processor state is restored to R7.

Figure 11:
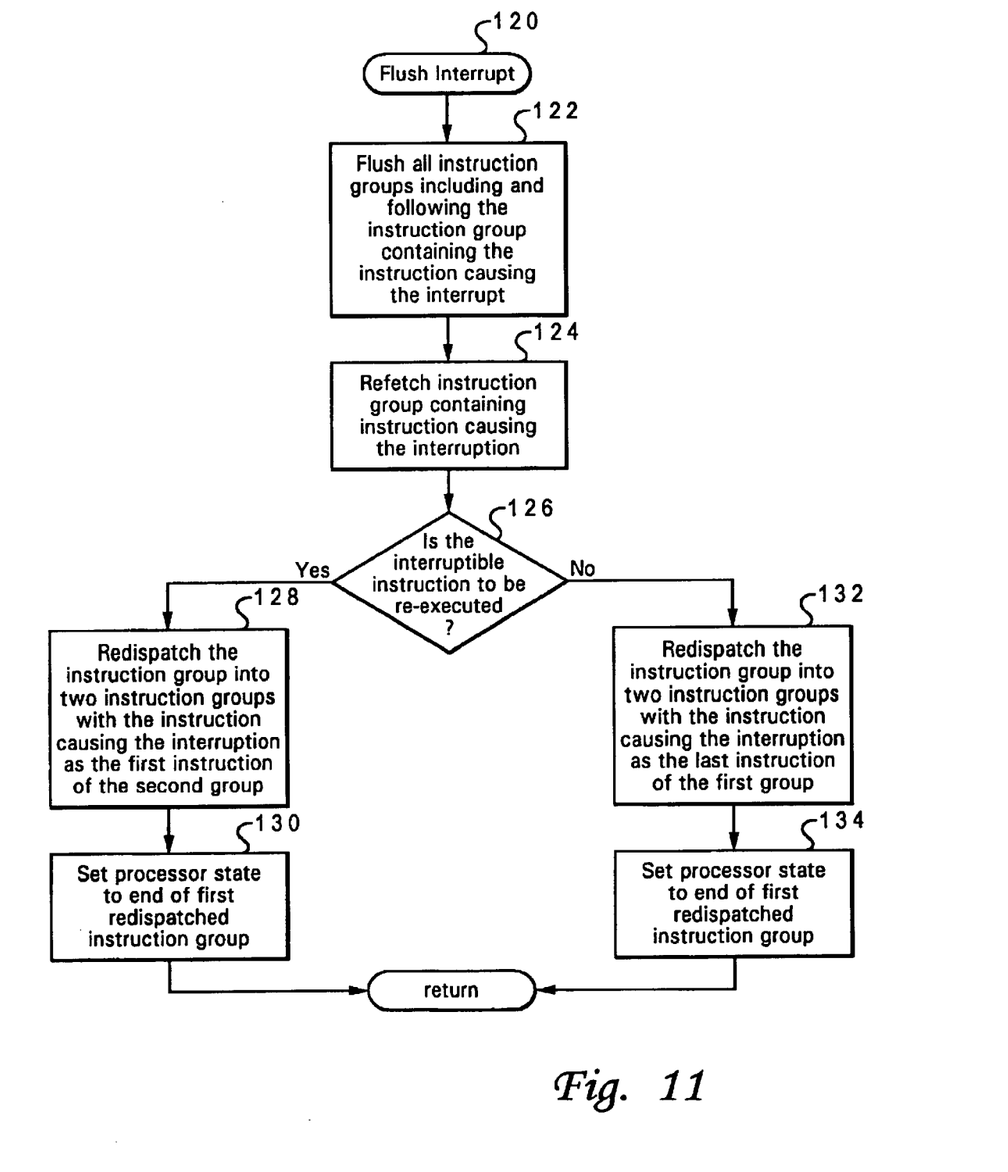
FIG. 11 is a high level logic flowchart illustrating a process for flushing instructions from a pipeline and restoring the pipeline to the proper processor state following an interruption caused by an interruptible instruction other than the selected type of interruptible instruction.

Referring now to FIG. 11, there is depicted a high level logic flowchart illustrating a process for flushing instructions from a pipeline and restoring the pipeline to the proper processor state following an interruption caused by an interruptible instruction other than the selected type of interruptible instruction. As illustrated, the process starts at block 120 whenever an instruction other than a branch instruction causes an interruption. Thereafter, block 122 depicts flushing all instructions included in instructions groups including and following the instruction causing the interruption. Next, block 124 illustrates refetching the instruction group containing the instruction causing the interruption. Thereafter, block 126 depicts a determination of whether or not the instruction causing the interruption is to be re-executed. If the instruction is to be re-executed, the process passes to block 128. However, if the instruction is not to be re-executed, the process passes to block 132.

Block 128 illustrates re-dispatching the fetched instruction group into two instruction groups where the instruction causing the interruption is the first instruction of the second instruction group. Thereafter, block 130 depicts setting the current processor state to the end of the first re-dispatched group such that when the process returns, the instruction that caused the interruption will be re-executed.

Block 132 depicts re-dispatching the fetched instruction group into two instruction groups where the instruction causing the interruption is the last instruction in the first group. Thereafter, block 134 illustrates setting the current processor state to the end of the first re-dispatched group such that when the processor returns, the instruction following the instruction that caused the interruption will be executed.

While the invention has been particularly shown and described with reference to a preferred embodiment, it will be understood by those skilled in the art that various changes in form and detail may be made therein without departing from the spirit and scope of the invention. For example, while the selected type of interruptible instruction is depicted being dispatched at the tail of an instruction group in the previous description, the selected type of interruptible instruction may alternatively be dispatched at the head of an instruction group and the processor state prior to dispatch associated with the instruction group. By dispatching a selected type of interruptible instruction at the head of an instruction group and associating the processor state recorded prior to dispatch, the processor state occurring prior to the selected type of interruptible instruction is easily recovered.

In addition, in an alternate embodiment, if an alternate type of instruction happens to be dispatched at the head or tail of an instruction group and causes an interrupt, the fast recovery method similar to that depicted in FIG. 6 may be utilized to recover the processor state in lieu of the process depicted in FIG. 11. For example, if an instruction group includes instructions load0, load1, load2 and load3 and the instruction load0 has an exception, it is preferable to recover the processor state prior to the instruction load0. In such a case, the processor state associated with the instruction group prior to the instruction group causing the exception would be recovered. Alternatively, if the instruction load3 causes an exception and it is preferable to recover the processor state just after the load3 instruction, then the processor state would be recovered as described in FIG. 6 for an instruction other than a branch instruction.

What is claimed is:

1. A method of increasing the efficiency of execution of a processor, comprising:
dispatching instructions in instruction groups, wherein if an instruction group contains an interruptible instruction of a selected type, only one interruptible instruction of said selected type is included in said instruction group, wherein said interruptible instruction of said selected type is dispatched at the front of said instruction group;
recording a state for the processor associated with a dispatched instruction group; and
restoring said processor to said recorded state associated with said dispatched instruction group containing said interruptible instruction of said selected type causing an interrupt, in response to said interrupt from one of said interruptible instructions of said selected type.

2. A method of increasing the efficiency of execution of a processor comprising:
searching a group of N fetched instructions for an interruptible instruction of said selected type;
dispatching said group of N fetched instructions in response to not finding said interruptible instruction of said selected type in said group of N fetched instructions;
selectively dispatching instructions from said group of instructions up to and including said interruptible instruction of said selected type, in response to finding an interruptible instruction of said selected type in said group of N fetched instructions, wherein if an instruction group contains an interruptible instruction of a selected type, only one interruptible instruction of said selected type is included in said instruction group;
recording a state for the processor associated with a dispatched instruction group; and
restoring said processor to said recorded state associated with said dispatched instruction group containing said interruptible instruction of said selected type causing an interrupt, in response to said interrupt from one of said interruptible instructions of said selected type.

3. The method of increasing the efficiency of execution of a processor according to claim 2, said method further comprising the step of:
designating branch instructions as said interruptible instruction of said selected type.

4. The method of increasing the efficiency of execution of a processor according to claim 2, wherein said method further comprises the steps of:
in response to an interrupt from any alternate interruptible instruction which is not of said selected type:
determining the position of said alternate interruptible instruction within the instruction group in which said alternate interruptible instruction is included;
flushing said instruction group in which said alternate interruptible instruction is included and all instruction groups dispatched thereafter and restoring said processor state to the processor state associated with the instruction group prior to said flushed instruction group, in response to determining that said alternate interruptible instruction is located at the front of said instruction group;
flushing all instruction groups dispatched after said instruction group in which said alternate interruptible instruction is included and restoring said processor state to the processor state of said instruction group, in response to determining that said alternate interruptible instruction is located at the end of said instruction group.

5. A method of increasing the efficiency of execution of a processor comprising the steps of:
dispatching instructions in instruction groups, wherein if an instruction group contains an interruptible instruction of a selected type, only one interruptible instruction of said selected type is included in said instruction group;
recording a state for the processor associated with a dispatched instruction group;
in response to said interrupt from one of said interruptible instructions of said selected type:
restoring said processor to said recorded state associated with said dispatched instruction group containing said interruptible instruction of said selected type causing an interrupt;

in response to an interrupt from any alternate interruptible instruction which is not of said selected type:

flushing any instruction groups dispatched including and after said instruction group which contains said alternate interruptible instruction;

restoring said deep-pipelined processor to a processor state recorded for the instruction group prior to said instruction group containing said alternate interruptible instruction;

refetching said instruction group which contains said alternate interruptible instruction; and determining if said alternative interruptible instruction is to be re-executed;

re-dispatching said re-fetched instruction group into two instruction groups where said alternate interruptible instruction is the first instruction of a second instruction group, in response to determining that said alternate interruptible instruction is to be re-executed;

re-dispatching said re-fetched instruction group into two instruction groups where said alternate interruptible instruction is the last instruction of a first groups in response to determining that said alternate interruptible instruction is not to be re-executed; and setting said processor state prior to said second instruction group.

6. A system for increasing the efficiency of execution of a processor, comprising:

means for dispatching instructions in instruction groups, wherein if an instruction group contains an interruptible instruction of a selected type, only one interruptible instruction of said selected type is included in said instruction group, wherein said interruptible instruction of said selected type is dispatched at the front of said instruction group;

means for recording a state for the processor associated with a dispatched instruction group; and means for restoring said processor to said recorded state associated with said dispatched instruction group containing said interruptible instruction of said selected type causing an interrupt, in response to said interrupt from one of said interruptible instructions of said selected type.

7. A system for increasing the efficiency of execution of a processor comprising:

means for searching a group of N fetched instructions for an interruptible instruction of said selected type;

means for dispatching said group of N fetched instructions in response to not finding said interruptible instruction of said selected type in said group of N fetched instructions;

means for selectively dispatching instructions from said group of instructions up to and including said interruptible instruction of said selected type, in response to finding an interruptible instruction of said selected type in said group of N fetched instructions, wherein if an instruction group contains an interruptible instruction of a selected type, only one interruptible instruction of said selected type is included in said instruction group;

means for recording a state for the processor associated with a dispatched instruction group; and means for restoring said processor to said recorded state associated with said dispatched instruction group containing said interruptible instruction of said selected type causing an interrupt, in response to said interrupt from one of said interruptible instructions of said selected type.

8. The system for increasing the efficiency of execution of a processor according to claim 7, said system further comprising:

means for designating branch instructions as said interruptible instruction of said selected type.

9. The system for increasing the efficiency of execution of a processor according to claim 7, wherein said system further comprises:

in response to an interrupt from any alternate interruptible instruction which is not of said selected type:

means for determining the position of said alternate interruptible instruction within the instruction group in which said alternate interruptible instruction is included;

means for flushing said instruction group in which said alternate interruptible instruction is included and all instruction groups dispatched thereafter and restoring said processor state to the processor state associated with the instruction group prior to said flushed instruction group, in response to determining that said alternate interruptible instruction is located at the front of said instruction group;

means for flushing all instruction groups dispatched after said instruction group in which said alternate interruptible instruction is included and restoring said processor state to the processor state of said instruction group, in response to determining that said alternate interruptible instruction is located at the tail of said instruction group.

10. A system for increasing the efficiency of execution of a processor comprising:

means for dispatching instructions in instruction groups, wherein if an instruction group contains an interruptible instruction of a selected type, only one interruptible instruction of said selected type is included in said instruction group;

means for recording a state for the processor associated with a dispatched instruction group;

means, in response to said interrupt from one of said interruptible instructions of said selected type for:

restoring said processor to said recorded state associated with said dispatched instruction group containing said interruptible instruction of said selected type causing an interrupt;

means, in response to an interrupt from any alternate interruptible instruction which is not of said selected type for:

flushing any instruction groups dispatched including and after said instruction group which contains said alternate interruptible instruction;

restoring said deep-pipelined processor to a processor state recorded for the instruction group prior to said instruction group containing said alternate interruptible instruction;

re-fetching said instruction group which contains said alternate interruptible instruction; and determining if said alternative interruptible instruction is to be re-executed;

means for re-dispatching said re-fetched instruction group into two instruction groups where said alternate interruptible instruction is the first instruction of a second instruction group, in response to determining that said alternate interruptible instruction is to be re-executed;

means for re-dispatching said re-fetched instruction group into two instruction groups where said alternate interruptible instruction is the last instruction of a first instruction group, in response to determining that said alternate interruptible instruction is not to be re-executed; and means for setting said processor state prior to said second group.

11. A data processing system comprising:

a processor having a plurality of execution units including a branch execution unit and an instruction fetching unit;

a memory that stores instructions utilized by said execution units;

means for coupling said memory to said processor;

means for dispatching instructions in instruction groups, wherein if an instruction group contains an interruptible instruction of a selected type, only one interruptible instruction of said selected type is included in said instruction group, wherein said interruptible instruction of said selected type is dispatched at the front of said instruction group;

means for recording a state for the processor associated with a dispatched instruction group; and means for restoring said processor to said recorded state associated with said dispatched instruction group containing said interruptible instruction of said selected type causing an interrupt, in response to said interrupt from one of said interruptible instructions of said selected type.

12. A data processing system comprising:

a processor having a plurality of execution units including a branch execution unit and an instruction fetching unit;

a memory that stores instructions utilized by said execution units;

means for coupling said memory to said processor;

means for searching a group of N fetched instructions for an interruptible instruction of said selected type;

means for dispatching said group of N fetched instructions in response to not finding said interruptible instruction of said selected type in said group of N fetched instructions;

means for selectively dispatching instructions from said group of instructions up to and including said interruptible instruction of said selected type, in response to finding an interruptible instruction of said selected type in said group of N fetched instructions, wherein if an instruction group contains an interruptible instruction of a selected type, only one interruptible instruction of said selected type is included in said instruction group;

means for recording a state for the processor associated with a dispatched instruction group; and means for restoring said processor to said recorded state associated with said dispatched instruction group containing said interruptible instruction of said selected type causing an interrupt, in response to said interrupt from one of said interruptible instructions of said selected type.

13. A data processing system comprising:

a processor having a plurality of execution units including a branch execution unit and an instruction fetching unit;

a memory that stores instructions utilized by said execution units;

means for coupling said memory to said processor;

means for dispatching instructions in instruction groups, wherein if an instruction group contains an interruptible instruction of a selected type, only one interruptible instruction of said selected type is included in said instruction group;

means for recording a state for the processor associated with a dispatched instruction group;

means, in response to said interrupt from one of said interruptible instructions of said selected type for:

restoring said processor to said recorded state associated with said dispatched instruction group containing said interruptible instruction of said selected type causing an interrupt;

means, in response to an interrupt from any alternate interruptible instruction which is not of said selected type for:

flushing any instruction groups dispatched including and after said instruction group which contains said alternate interruptible instruction;

restoring said deep-pipelined processor to a processor state recorded for the instruction group prior to said instruction group containing said alternate interruptible instruction;

re-fetching said instruction group which contains said alternate interruptible instruction; and determining if said alternative interruptible instruction is to be re-executed;

means for re-dispatching said re-fetched instruction group into two instruction groups where said alternate interruptible instruction is the first instruction of a second instruction group, in response to determining that said alternate interruptible instruction is to be re-executed;

means for re-dispatching said re-fetched instruction group into two instruction groups where said alternate interruptible instruction is the last instruction of a first instruction group, in response to determining that said alternate interruptible instruction is not to be re-executed; and means for setting said processor state prior to said second group.

* * * * *